July 19, 1949.                    P. GLASS                    2,476,657
                       ELECTRONIC MOTOR CONTROL CIRCUITS
Filed May 31, 1943                                      3 Sheets-Sheet 1
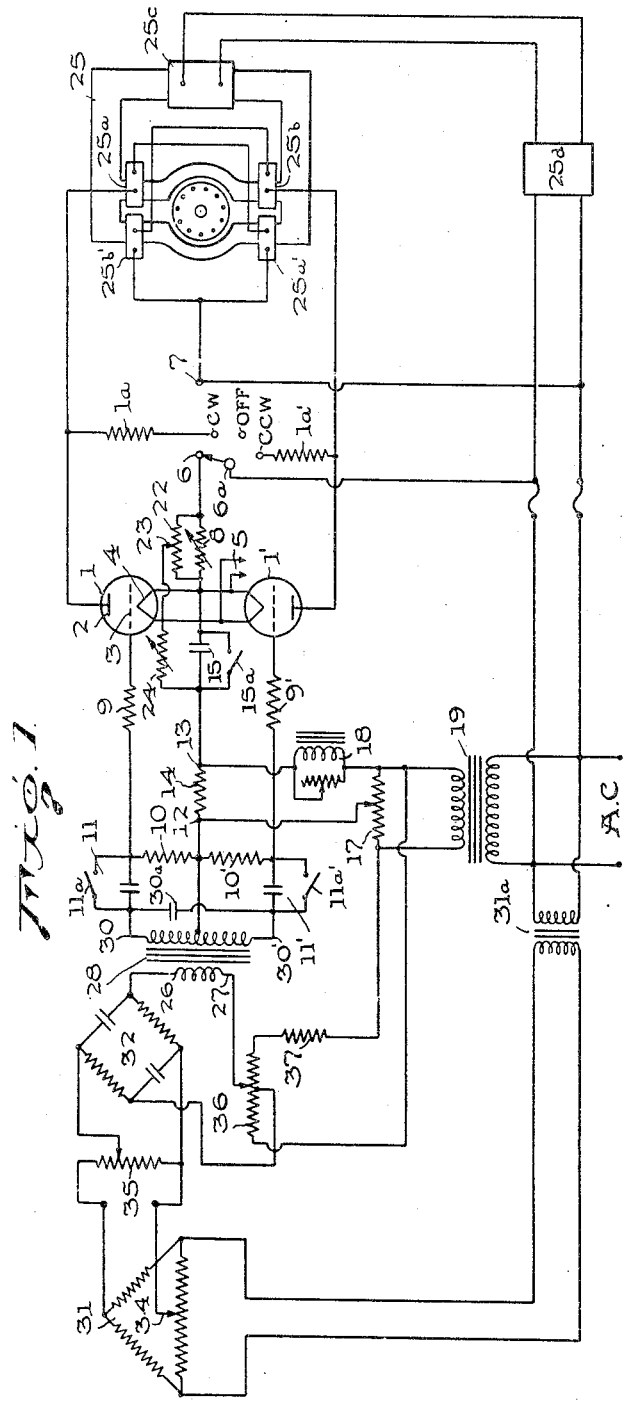
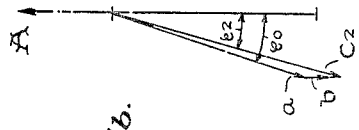
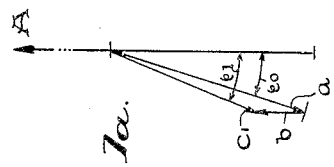
INVENTOR.
PAUL GLASS
BY
Ralph B. Stewart
ATTORNEY July 19, 1949.  P. GLASS  2,476,657
ELECTRONIC MOTOR CONTROL CIRCUITS
Filed May 31, 1943    3 Sheets-Sheet 2
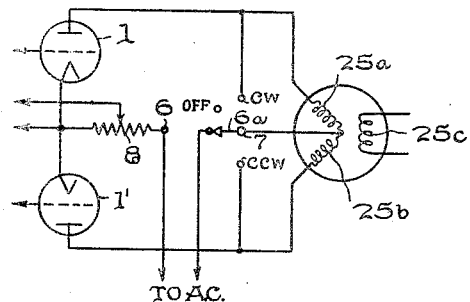
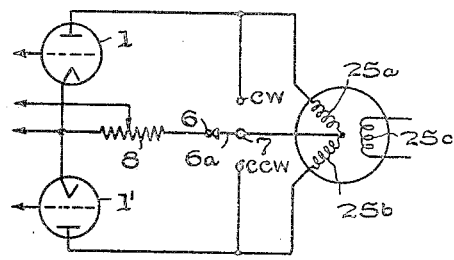
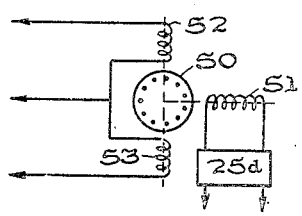
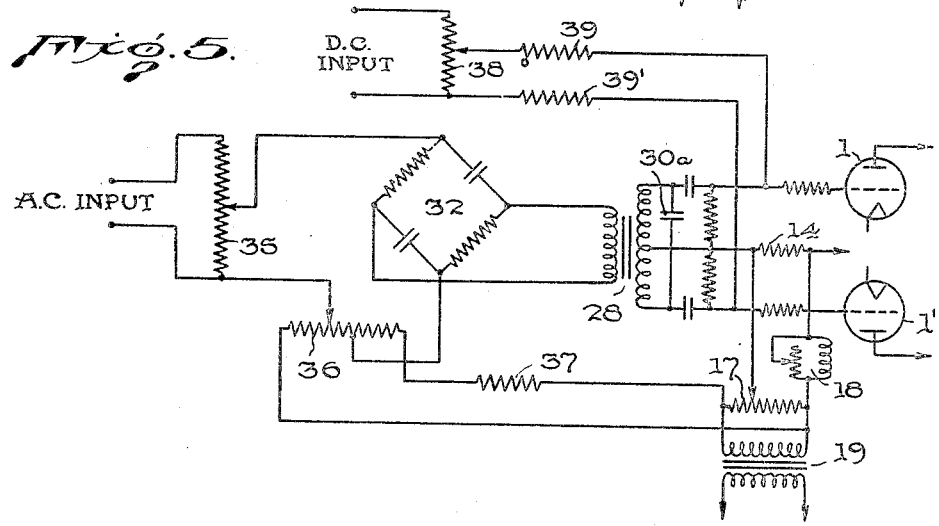
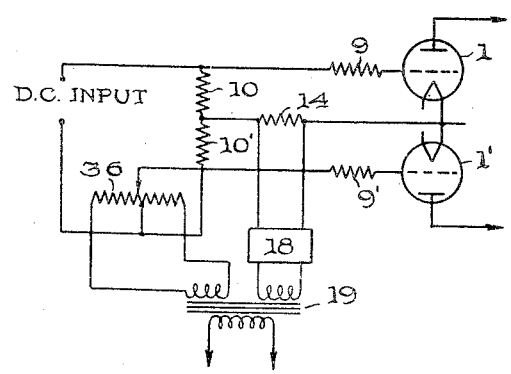
INVENTOR.
PAUL GLASS
BY
Ralph B. Stewart
ATTORNEY July 19, 1949.  P. GLASS  2,476,657
ELECTRONIC MOTOR CONTROL CIRCUITS
Filed May 31, 1943  3 Sheets-Sheet 3

INVENTOR.
PAUL GLASS
BY
Ralph B. Stewart
ATTORNEY

Patented July 19, 1949

2,476,657

UNITED STATES PATENT OFFICE 2,476,657

ELECTRONIC MOTOR CONTROL CIRCUITS

Paul Glass, Chicago, Ill., assignor to Askania Regulator Company, a corporation of Illinois Application May 31, 1943, Serial No. 489,207

4 Claims. (Cl. 318—207)

This invention relates to electronic control circuits.

An object of the invention is to devise a pulsation control circuit of the type disclosed in my copending application Serial No. 467,669, filed December 2, 1942 (now Patent 2,386,677), for the control and operation of electric motors of the induction type which are normally classified as constant speed motors. According to the present invention, such motors may be operated at varying speeds depending upon the amplitude of an input signal supplied to the control circuit.

A further object of the invention is to provide means for compensating for differences in operating characteristics of two electron tubes employed in the control circuit.

Another object is to provide an electronic control circuit for selectively and variably energizing two alternating current load circuits in accordance with the polarity and amplitude of a direct current signal.

Still another object is to provide for manual control of the motor or automatic control as desired.

Figure 7:
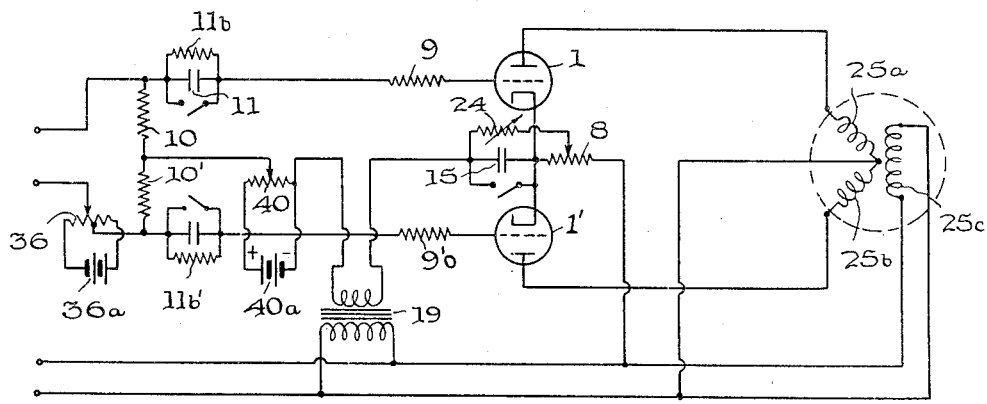
Figure 7A:
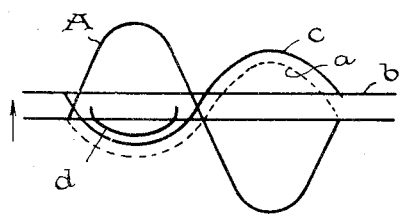
Figure 7B:
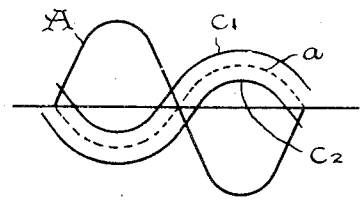

Certain embodiments of the invention are illustrated in the accompanying drawing in which Figure 1 is a circuit diagram showing one form of the control circuit for controlling a shaded pole induction motor; Figures 1a and 1b are vector diagrams for explaining the operation of the equalizer embodied in Figure 1; Figures 2 and 3 show modified arrangements of the manual control switch; Figure 4 is a fragmentary diagram showing connections for a two-phase induction motor; Figures 5 and 6 show two variations in the equalizer circuit arrangement and also provision for control by D. C. signals; and Figures 7, 7a and 7b illustrate a pulsating control circuit for controlling the speed and direction of operation of an A. C. motor in accordance with the amplitude and polarity of a D. C. signal.

In my application above identified, I have disclosed a pulsation control circuit for supplying to a load device periodic groups of current pulses, the number of pulses in each group being variable, and the group frequency being variable. A series commutator motor of the split-field type was used as the load device. While such a motor gives satisfactory operation in general, the use of a commutator and brushes may be objectionable in a number of applications. I have discovered that the pulsation circuits disclosed in my earlier application may be used for operating commutator-less types of motors at variable speeds, notwithstanding the fact that these motors have a normal constant speed characteristic. Use of the pulsation circuit makes it possible to operate induction motors at an average speed which is proportional to the amplitude of the signal applied to the circuit, and the motor may be reversed by merely reversing the phase of the signal. No switching operation is required.

Referring to Figure 1, the pulsation circuit involves two electron tubes 1 and 1' of the gaseous discharge type, each embodying a plate 2, a grid 3 and a cathode 4, the cathodes being energized from a suitable supply circuit 5.

The supply terminals for the plate circuits of the two tubes are shown at 6 and 7. A biasing resistance 8 is included in the common cathode return for the two tubes. The grid circuit of tube 1 includes in series resistances 9, 10 and 14 and a condenser 15. The grid circuit of tube 1' includes in series resistances 9', 10', and 14 and condenser 15. Signal potentials of opposite polarity are applied across resistances 10 and 10' by means of condensers 11 and 11' which connect the outer terminals of these resistances to terminals 30 and 30' of the secondary winding of an input transformer 28. The secondary winding is shunted by a condenser 30a.

An alternating current biasing potential of adjustable amplitude and phase is supplied to the terminals 12 and 13 of resistance 14 through a potentiometer 17 and a phase shifter 18 which in turn are supplied from transformer 19 connected to a suitable supply circuit AC.

Biasing resistance 8 is shunted by a potentiometer 22 having a variable contact 23 connected to the grid side of condenser 15 through a variable resistance 24. This connection serves to charge condenser 15 to a negative potential depending on the potential drop across resistance 8.

The plate circuits of tubes 1 and 1' are connected to supply current to the shaded pole windings of an induction motor 25 of the shaded pole type. The plate circuit of tube 1 is completed through shaded pole windings 25a and 25a' to supply terminal 7, while the plate circuit of tube 1' is completed through pole windings 25b and 25b' to supply terminal 7. The field winding 25C of the motor is constantly energized from the supply AC through a suitable phase shifter 25d. Supply terminal 6 forms one stationary contact of a rotary switch 6a which is connected to one side of the supply circuit AC, and terminal 7 is connected to the other side of the AC supply. Switch 6a is provided with additional contacts CW, "off," and CCW as shown. Contact CW is connected to the plate lead of tube 1 through resistance 1a, contact CCW is connected to the plate lead of tube 1' through resistance 1a', and the contact "off" is free.

The construction of the shaded pole motor is well known, and it will be understood that the motor will operate in one direction or the other upon energization of one or the other of the shaded pole windings. When the switch 6a is in contact with terminal 6, the operation of the motor is controlled by tubes 1 and 1' in accordance with signals supplied to input transformer 28.

The input signals may be derived from any source which is to control the operation of the motor. The signal should have the same frequency as the current supply for resistance 14 and the plate circuits of tubes 1 and 1'. One suitable arrangement is shown in Figure 1 involving a bridge 31 energized from supply AC through transformer 31a and having a movable contact 34 by which a signal of reversible phase and variable amplitude may be supplied to the input terminals 26 and 27 of transformer 28 through a potentiometer 35 and a phase shifter 32. The input signal circuit also includes the center tap and the sliding contact on an equalizer resistance 36 which is supplied from the source AC through a suitable limiting resistance 37.

As explained in my copending application Serial No. 467,669, one of the tubes will be periodically energized to produce groups of current pulses in the output circuit, depending upon the sense and amplitude of the input signal. To secure such operation, the time constant of the resistance-condenser network 10, 11 is so arranged that it is short compared with the time constant of the network comprising condenser 15, variable resistor 24, and part of potentiometer 22. The latter resistance is usually small compared with resistance 24. The capacitance of condenser 15 is large compared with the capacitance of condenser 11.

The pulsing action of the circuit may be explained briefly as follows:

When the signal causes tube 1 to fire, the plate current flowing through resistance 8 impresses a negative potential on the grid terminal side of condenser 15 and begins charging through resistance 24. Simultaneously, the positive ion current flowing in the grid circuit of tube 1 charges condenser 11 to a certain potential, and this charge tends to bias grid 3 to a positive potential. The negative charge on condenser 15 increases with each positive alternation of current passing through the resistance 8, and the tube will remain conductive for a number of cycles until the potential of condenser 15 exceeds the combined potential of the input signal and that of condenser 11, and then the tube will cease firing. The charge on condenser 11 is immediately dissipated through resistance 10, and the charge on condenser 15 begins to dissipate through resistance 24. The tube remains inactive until the grid potential supplied from condenser 15 reaches a certain low value where the tube will begin firing again. Thus, the tube upon firing will allow a certain number of positive pulses to pass through the tube while condenser 15 is charging, and then the tube will be blocked by condenser 15 for a number of cycles during which no current flows through the tube. This cycle of operation is repeated continuously. Increase in signal potential requires a greater number of anode current pulses to charge condenser 15 to the cut-off value, and vice versa.

The A. C. voltage supplied to terminals 12—13 of resistance 14 by potentiometer 17 is adjusted to an amplitude greatly in excess of that required to prevent conduction of the tubes when the suppressing voltage 12—13 is 180° out of phase with the anode voltages, and the voltages 12—13 normally prevents firing of the tubes in the absence of a signal.

Phase shifter 18 is adjusted so that the voltage 12—13 leads the anode voltage by an angle somewhat less than 180°. The function of phase shifter 18 is to overcome the "dead zone" of tubes 1 and 1' by shifting the phase of the potential 12—13 to a phase angle such that a very small signal voltage supplied to transformer 28 will cause one or the other of the tubes to fire.

The phase shifter 32 is adjusted so that the signal voltage induced in the grid circuits of tubes 1 and 1' is displaced by substantially 90° with respect to the line voltage or the voltage applied to the anodes of the tubes. Since the signal voltages in the two grid circuits are of opposite phase, one signal voltage will combine with the voltage 12—13 to retard the phase of the voltage of the grid applied to one tube and cause that tube to operate. The other signal voltage, being of opposite phase, will combine with voltage 12—13 and advance the phase of the grid voltage of the other tube and will therefore prevent operation of the second tube. Accordingly, the grid voltage of one tube is retarded in phase by increasing amounts as the amplitude of the input signal increases, and this results in a greater number of current pulses in each pulse group flowing in the plate circuit. Should the signal reverse in phase, the tube which formerly was active will now become inactive, and the second tube will become active in the same manner as the first tube.

From the foregoing it will be apparent that when the signal has a certain sense or phase relation, tube 1 will be effective to energize shaded pole windings 25a and 25a' to operate the motor in one direction, and when the signal reverses in sense or phase, tube 1 will become inactive while tube 1' will become active to energize pole windings 25b and 25b' to operate the motor in the opposite direction. Since the motor windings are energized periodically, that is, they are energized periodically, that is, they are energized during the "on time" and are de-energized during the "off time" of each pulse group period, the average speed of the motor will depend upon the ratio of the on time to the off time, and since this ratio depends on the amplitude of the signal, the average speed of the motor will vary in accordance with the amplitude of the signal. It will be understood that during the on time, the tube conducts a current pulse of substantially uniform value during each positive alternation of the plate voltage, and the number of current pulses included in each group is dependent upon the amplitude of the input signal.

It will be understood that in Figure 1 the shading windings are energized by half-wave rectified currents which contain a sine-wave component of line frequency which establishes a magnetic field in the shaded areas in the usual way to produce a rotating magnetic field which drives the armature. By adjusting phase shifter 25d it is possible to adjust the time lag between the main field and the field in the shaded pole areas and thereby adjust the torque of the motor. The same result may be obtained by including a phase shifter in the supply lines connected to terminals 6—7, Where the currents supplied to winding 25c and to the shaded pole windings are in phase, I find that maximum torque is obtained for a current value in the shaded pole winding of approximately one and one-half times the amplitude of the current which would normally flow in the shaded pole coil when directly short-circuited.

It will also be understood that the motor speed is substantially constant for any given signal strength. This condition is obtained by fixing the rate of interruption, or the group frequency, at a value sufficiently high to prevent substantial pulsation in the speed of the motor.

It will be found that the two tubes I and I', even if specially selected, will not have exactly the same characteristics, but a higher signal will be required to start one tube than the other. For this reason, the amount of pre-phase shift by phase shifter 18 from the 180° position is limited by the more sensitive tube, while the less sensitive tube will require a higher pre-phase shift in order to eliminate its dead zone. This can easily be observed by shortcircuiting the input signal terminals and advancing the phase by adjusting phase shifter 18 until the more sensitive tube fires, and it will be found that a further shift is required to cause the less sensitive tube to fire.

In order to equalize the tubes so that they will start firing at the same signal value, an additional A. C. biasing voltage is introduced into the grid circuits for the purpose of producing relative shift in phase between the resultant grid voltages in the two grid circuits. Preferably both grid voltages are shifted in phase simultaneously but in opposite directions. For this purpose, I may introduce into the two grid circuits supplemental A. C. biasing voltages which are opposite in phase, but are displaced in phase with respect to the suppressing voltage supplied across terminals 12—13 of resistance 14. In the arrangement illustrated in Figure 1, the supplemental biasing voltage is derived from center tapped potentiometer 36 which is supplied from the AC source through a limiting resistor 37. By shifting the contact on potentiometer 36 to the right, an A. C. voltage is introduced in the primary circuit of transformer 28 which induces equal but opposite voltages in the grid circuits of tubes I and I'. If the potentiometer contact is shifted to the left, the supplemental A. C. voltages will be reversed in phase.

The operation of the equalizer may be explained by the vector diagrams shown in Figures 1a and 1b. Vector A is the line voltage (or plate voltage), and $a$ represents the suppressing A. C. potential developed across resistance 14, and this potential is common to the two grid circuits. The phase relation of vector $a$ is fixed by phase shifter 18, and this voltage leads the plate voltage by (180—$\epsilon$0) degrees ($\epsilon$ being epsilon). If it is supposed that the phase shift angles necessary to just fire tubes I and I' are $\epsilon$1 and $\epsilon$2, respectively, then the pre-phase shift $\epsilon$0 would not be sufficient to fire tube I but would be ample to fire tube I'. The supplemental equalizing voltage introduced from equalizer 36 is shown by the vectors $b$ and $b'$ in Figures 1a and 1b, respectively, and it will be noted that these vectors have opposite phase relation, $b$ being in phase with the anode voltage, while $b'$ is opposite in phase to the anode voltage. The resultant A. C. biasing voltages for the two grid circuits are now represented by the vectors C1 for tube I and C2 for tube I', and these vectors have the proper phase angle to adjust both tubes so that they fire at the same signal values.

From the foregoing it is clear that movement of the contact on potentiometer 36 to the right advances the phase of the resultant A. C. grid voltage of one tube and retards the phase of the grid voltage of the other side. Movement of the contact to the left has the reverse effect.

In practice the amount of equalizing voltage necessary to equalize the two tubes is small compared with the common suppressing voltage developed across resistor 14. It is not necessary that the equalizing voltages be in phase and opposite in phase with the anode voltage, but they should be out of phase with the voltage developed across resistor 14.

By sliding the contact on potentiometer 36 to the right or the left, equalization can be obtained without exchanging the positions of the tubes, and it is not necessary that the tubes be placed in the sockets in any particular order. To equalize the operation of the tubes, the input terminals of potentiometer 35 are first shortcircuited, and potentiometer 36 is adjusted until both tubes fire at the same instant upon advancement of the phase by phase shifter 18. Equalizing adjustments should be made upon replacement of tubes, or in case of one tube aging to a different degree from the other.

It is obvious that with a constant input signal, the speed of the motor may be varied manually by adjustment of the sliding contact of potentiometer 35 or by adjusting other variable elements such as potentiometer 22 or resistance 8.

When switch 6a is resting on contact 6, the motor is controlled by tubes I and I'. If it is desired to control the direction of rotation of the motor independently of the signal and independently of tubes I and I', switch 6a may be moved to contact CW where the circuit of pole windings 25a—25a' will be completed to operate the motor in a clockwise direction, and by moving the switch to contact CCW, the motor will be energized to rotate in a counter-clockwise direction. Resistances 1a and 1a' serve to limit the currents in the shaded pole windings to approximately the values which would normally flow through tubes I and I'. The "off" contact is provided for preventing operation of the motor.

An alternative arrangement of the manual control switch 6a is shown in Figure 2. The rotary part of the switch is connected to terminal 7, so that it directly shortcircuits shaded pole windings 25a and 25b when in contact with contacts CW and CCW respectively. In an intermediate position it connects one side of the A. C. supply to the common terminal of the shaded pole windings for control by tubes I and I'.

Still another variation of the manual control switch and the motor supply circuit is shown in Figure 3. This arrangement corresponds to Figure 2 except that the A. C. supply circuit for the shaded pole windings is omitted, and the voltages induced in the shaded pole windings from field winding 25c supply the plate current to tubes I and I'. These induced voltages are always present in the plate circuits of the two tubes, and one or the other tube will break down as a suitable signal is applied to the input terminals. In other respects the circuit operates the same as Figure 1.

If it is desired to obtain directional speed control of the motor in accordance with reversible signals without variation in speed of the motor in accordance with the amplitude of the signal, condensers 11, 11' and 15 are not required and may be removed or shortcircuited by switches 11a, 11a' and 15a.

Shaded pole motors of the type illustrated in Figure 1 have certain limitations, especially due to the fact that the two component fields are not displaced by 90° in space and also in time. In Figure 4 I have shown connections for operating a two-phase motor having a squirrel-cage rotor 50 and three stator windings. One phase circuit includes winding 51 supplied through phase shifter 25d, while the second phase circuit includes winding 52 or winding 53, depending upon the desired direction of rotation. Windings 52 and 53 are wound on the same axis, while winding 51 is wound on an axis located at right angles to the axis of windings 52 and 53 in the usual manner. Phase shifter 25d is designed so that the current energizing winding 51 is in quadrature phase relation with respect to the energizing current in winding 52 or 53. Windings 52 and 53 are wound to produce fields in opposite directions.

It will be understood that a signal of a given phase will cause tube 1 to energize field winding 52 and will operate armature 50 in one direction, while a reversal in phase of the signal will cause tube 1' to energize field winding 53 and operate armature 50 in the opposite direction. Since the two component fields established in Figure 4 are displaced by 90° both in space and time, the starting and operating torque will be at a maximum.

Figure 5 is a fragmentary circuit diagram showing a variation in the equalizer arrangement, and also illustrating an arrangement for controlling the circuit by a direct current signal. The equalizer arrangement is the same as in Figure 1 except that the potentiometer 36 is connected in the input side of phase shifter 32 instead of in the output side. This arrangement is preferred over the arrangement shown in Figure 1 for the reason that the equalizing voltages are shifted in phase by the phase shifter 32 and have a phase angle displaced in phase by substantially 90° with reference to the equalizing voltages b shown in Figures 1a and 1b. With this phase angle, smaller equalizing voltages are required to shift the resultant grid voltages from the vector a to the vector c, and the resulting vectors c1 and c2 in Figures 1a and 1b are substantially equal in amplitude.

If it is desired to control the operation of tubes 1 and 1' in accordance with direct current signals which vary in polarity as well as in amplitude, these signals may be impressed across the grid circuits of these tubes through a potentiometer 38 and series resistances or inductances 39 and 39' which prevent the source of D. C. signals from influencing the A. C. voltages applied through transformer 28 to the grid circuits. A D. C. signal of one polarity will cause operation of one tube while a signal of the opposite polarity will cause the other tube to operate. The effective output current will vary in accordance with the amplitude of the D. C. signal, and the operation is not dependent upon the presence of an A. C. signal supplied through potentiometer 35.

The function of condenser 30a shown in Figures 1 and 5 is to prevent high frequency disturbances originating in the signal source from affecting the operation of tubes 1 and 1'.

While I prefer to apply equalizing voltages to the grid circuits of both tubes, it is possible to secure equalization by applying an equalizing voltage to only one grid circuit. An arrangement of this type is shown in the fragmentary diagram of Figure 6. This arrangement will also respond to direct current signals as well as alternating current signals, but it does not involve the pulsation feature of Figure 1. The D. C. input signals are applied across resistances 10 and 10' in series, and potentiometer 36 is connected in series with the grid circuit of tube 1', whereby an A. C. equalizing voltage of reversible phase and variable amplitude may be applied to the grid circuit of one of the tubes. Equalizer 36 is shown as being supplied from a separate winding on transformer 19, but it may be supplied as in Figure 1 or in any other suitable manner. A phase shifter may be included in the supply circuit to potenitometer 36 so that the equalizing voltage is in phase quadrature with the A. C. biasing voltage developed across resistance 14 or has any other desired phase relation. In this arrangement, the equalizing voltage serves to shift the phase of only one of the suppressing grid voltages, the other suppressing grid voltage remaining fixed in phase and amplitude.

In Figure 7 I have shown a control circuit wherein the plate circuits of tubes 1 and 1', which are energized from an alternating current source, are selectively and variably energized in accordance with the polarity and amplitude of a direct current signal. In this particular circuit, the two plate circuits control the direction of operation of a shaded pole motor, but it is obvious that the two circuits may be employed for energizing other devices. This circuit arrangement involves the pulsation method of operation described above in connection with Figure 1, and elements corresponding to similar elements in Figure 1 are represented by like reference numerals. This arrangement, however, differs from Figure 1 in several respects. First, the direct current signals are impressed across resistances 10 and 10' in series with equalizer potentiometer 36. Also, instead of supplying alternating current to equalizer 36 a direct current is supplied from a suitable source represented by the battery 36a. It will be understood that equalizer 36 supplies equalizing potentials of opposite polarity to the grid circuits of tubes 1 and 1', and these equalizing potentials may be varied in amplitude and reversed in polarity by adjustment of the contact on potentiometer 36. Condensers 11 and 11' connected in the grid circuits of tubes 1 and 1', respectively, are shunted by high resistances 11b and 11b', respectively. The secondary winding of transformer 19 is connected directly in the common grid lead for the two tubes and this winding supplies a suppressing voltage displaced in phase with respect to the plate voltages by 180° and of an amplitude greatly in excess of that necessary to prevent firing of the tubes.

A variable direct current voltage is also introduced in the common grid lead for the two tubes by a potentiometer 40 supplied from a suitable source represented by the battery 40a. Condenser 15 inserted in the common grid lead is charged from the potential drop across resistance 8 through resistance 24 as in Figure 1. The plate circuit of tube 1 controls the current supplied to shaded pole winding 25a from the A. C. source, and tube 1' controls the current supplied to shaded pole winding 25b. The field winding 25c is energized directly from the A. C. source.

In Figure 7a, the curve A represents the potentials applied to the plates of tubes 1 and 1' in Figure 7. The dotted curve $a$ represents the common A. C. suppressing voltage applied to the grid circuits of the two tubes from the secondary of transformer 19. The line $b$ parallel to the zero line represents the positive potential applied to each grid from the potentiometer 40, and the solid curve $c$ represents the resultant potential applied to each grid of tubes 1 and 1' from transformer 19 and potentiometer 40. It is clear that the resultant effect of the D. C. bias from potentiometer 40 is to shift the A. C. suppressing voltage curve $a$ upwardly to the position $c$, and the D. C. biasing voltage is adjusted until this curve just fails to touch the critical characteristic curve $d$. In this way, the so called "dead zone" of the tubes is reduced, and a very small signal voltage will serve to cause one tube to fire, depending on the polarity of the signal. If the two tubes have slightly different characteristics, adjustment of the contact on equalizer 36 will secure operation of the two tubes in response to equal signal voltages. The effect of the equalizer adjustment is illustrated in Figure 7b where curves $c1$ and $c2$ represent the individual grid voltage curves which are required in order to just fail to touch the respective critical grid characteristics. These characteristic curves as well as the D. C. bias line are omitted from Figure 7b for the sake of clearness, and it will be understood that the separation between the curves $c1$ and $c2$ is greatly exaggerated.

An incoming signal which causes the grid of tube 1 to go more positive will cause this tube to fire and will energize the motor for operation in one direction, while an incoming signal which causes the grid of tube 1' to go more positive will cause the motor to operate in the reverse direction. In either case, the incoming signal causes the grid of the inoperative tube to become less positive and thereby insures against operation of both tubes. Furthermore, due to the action of condensers 11, 11' and 15, the circuit has the same pulsating mode of operation as described above in connection with Figure 1 and as more fully described in my copending application Serial No. 467,669. Due to this pulsating effect, the effective current supplied to the plate circuits of the tubes 1 and 1' varies in accordance with the amplitude of the applied signal, and the speed of the motor varies accordingly. One advantage of the circuit shown in Figure 7 is that it does not require the use of phase shifting devices.

The arrangements for equalizing the operation of the two gaseous discharge tubes may be used in circuits for controlling other types of load devices, and the utility of these arrangements is not limited to the control of electric motors. Also, the utility of the manually operated switch 6a is not limited to the control of the particular types of motors illustrated herein.

I claim:

1. A motor control circuit comprising, in combination, a reversible motor having two windings controlling the direction of rotation of said motor, a pair of three-element gaseous discharge tubes for energizing said windings, a three-position switch having one contact thereof connected by a common lead to the cathodes of said tubes, a connection extending from the movable contact of said switch to a common terminal for said windings, separate connections extending from the free terminals of said windings to the anode elements of said tubes respectively, and separate connections extending from the anode leads of said tubes to the remaining two contacts of said switch, whereby the circuits of said windings may be completed through said tubes or through contacts on said switch.

2. A circuit for operating induction motors at variable speeds comprising, in combination, an induction motor having at least two field windings, a circuit including a source of alternating current of constant frequency for energizing one of said field windings, a second circuit energized from said source for supplying current to the second field winding, a gaseous triode having its cathode-anode path included in one of said circuits, an electrically operated pulsation circuit including a timing condenser for controlling the grid of said triode for periodically interrupting the motor operating circuit at a frequency sufficiently high to prevent substantial pulsation in the speed of said motor, and a source of variable potential signal connected to said timing circuit for controlling the period of firing of said triode.

3. A circuit for operating induction motors at variable speeds comprising, in combination, an induction motor having an energizing winding, a source of alternating current of constant frequency, a gaseous triode having its anode-cathode path included in a circuit for energizing said motor winding from said source, an electrically operated pulsation circuit including a timing condenser for controlling the grid of said triode to periodically interrupt the motor operating circuit of said winding at a frequency sufficiently high to prevent substantial pulsation of the speed of said motor, and a source of variable potential signal current connected to the grid circuit of said triode and controlling the period of firing of said triode to vary the number of current pulses supplied to the motor between interruptions.

4. A circuit according to claim 3 wherein said condenser is connected between the cathode and the grid of said triode, and including a connection for charging the grid side of said condenser to a negative potential by direct current voltage pulses derived from the current pulses flowing in the circuit of said energizing winding.

PAUL GLASS.

REFERENCES CITED

The following references are of record in the file of this patent:

UNITED STATES PATENTS

| Number | Name | Date |
| --- | --- | --- |
| 1,942,587 | Whitman | Jan. 9, 1934 |
| 1,970,162 | Blamberg | Aug. 14, 1934 |
| 2,001,836 | Craig | May 21, 1935 |
| 2,079,497 | Wilhjelm | May 4, 1937 |
| 2,109,776 | Johnson | Mar. 1, 1938 |
| 2,150,265 | Conover | Mar. 14, 1939 |
| 2,164,728 | Wey | July 4, 1939 |
| 2,221,517 | Holters | Nov. 12, 1940 |
| 2,272,714 | Lamb | Feb. 10, 1942 |
| 2,314,937 | Hannon | Mar. 10, 1943 |
| 2,333,393 | Ryder | Nov. 2, 1943 |

FOREIGN PATENTS

| Number | Country | Date |
| --- | --- | --- |
| 522,130 | Great Britain | June 10, 1940 |

Certificate of Correction

Patent No. 2,476,657                                      July 19, 1949

PAUL GLASS

It is hereby certified that errors appear in the printed specification of the above numbered patent requiring correction as follows:

Column 4, lines 48 and 49, strike out the words and commas "that is, they are energized periodically,"; column 6, line 7, for "side" read *tube*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*